US00RE47360E

(19) United States
(12) Reissued Patent
Oymaian

(10) Patent Number: US RE47,360 E
(45) Date of Reissued Patent: Apr. 23, 2019

(54) METHOD AND APPARATUS FOR REMOVING A KNOCKOUT

(71) Applicant: J.A.O. TOOL, INC., Orange, CA (US)

(72) Inventor: Jeffrey A. Oymaian, Orange, CA (US)

(73) Assignee: J.A.O. TOOL, INC., Orange, CA (US)

(21) Appl. No.: 14/925,927

(22) Filed: Oct. 28, 2015

Related U.S. Patent Documents

Reissue of:
(64) Patent No.: 8,567,029
Issued: Oct. 29, 2013
Appl. No.: 13/043,218
Filed: Mar. 8, 2011

U.S. Applications:
(60) Provisional application No. 61/312,141, filed on Mar. 9, 2010.

(51) Int. Cl.

| | |
|---|---|
| ***B23P 19/04*** | (2006.01) |
| ***B25B 27/14*** | (2006.01) |
| ***B23D 63/18*** | (2006.01) |
| ***B25B 13/04*** | (2006.01) |

(52) U.S. Cl.
CPC ..... *B25B 27/14* (2013.01); *B23D 63/18* (2013.01); *B25B 13/04* (2013.01); *Y10T 29/49822* (2015.01); *Y10T 29/53896* (2015.01); *Y10T 29/53943* (2015.01)

(58) Field of Classification Search
None
See application file for complete search history.

(56) References Cited

U.S. PATENT DOCUMENTS

| | | | | | |
|---|---|---|---|---|---|
| 2,103,008 | A | * | 12/1937 | Kinast | 254/21 |
| 2,571,401 | A | * | 10/1951 | Williams | 81/3.55 |
| 3,204,907 | A | * | 9/1965 | Tattrie | 248/211 |
| 3,736,643 | A | * | 6/1973 | Pepe | 29/267 |
| 3,854,282 | A | * | 12/1974 | Mazel | 59/7 |
| 4,167,056 | A | * | 9/1979 | Nattel | 29/267 |
| 4,455,894 | A | * | 6/1984 | Roberts | 81/3.09 |
| 4,768,271 | A | * | 9/1988 | Jacob et al. | 29/267 |
| 5,018,409 | A | * | 5/1991 | Bittel | 81/3.55 |
| 5,207,126 | A | * | 5/1993 | Schaben | 81/45 |
| D358,534 | S | * | 5/1995 | Link | D8/17 |
| 5,819,610 | A | * | 10/1998 | Brannan | 81/437 |
| 5,937,695 | A | * | 8/1999 | Patterson | 72/458 |

(Continued)

*Primary Examiner* — Jeffrey L Gellner
(74) *Attorney, Agent, or Firm* — Knobbe, Martens, Olson & Bear, LLP

(57) ABSTRACT

An apparatus for removing a knockout region from a saw blade includes an elongate body having a center axis. A distal end of the elongate body can include a head, having a concave region, wherein the concave region has a fulcrum section. A slot includes a first surface and a second surface opposite the second surface. The first surface and the second surface preferably are separated be a width greater than the thickness of the saw blade. The slot is positioned rearward of the concave region and is angled at a substantially acute angle relative to the center axis. The concave region is sized and shaped such that the fulcrum section contacts a first face of the saw blade and the slot is sized and shaped such that the first surface of the slot contacts a second face of the saw blade. Preferably, the fulcrum region engages the first region and the slot engages the second portion at the same time.

13 Claims, 6 Drawing Sheets

(56) References Cited

U.S. PATENT DOCUMENTS

| | | | | | |
|---|---|---|---|---|---|
| D422,858 | S | * | 4/2000 | Moore | D8/17 |
| D439,126 | S | * | 3/2001 | Gohman | D8/89 |
| D462,245 | S | * | 9/2002 | Friedman | D8/21 |
| 6,470,548 | B2 | * | 10/2002 | Kao | 29/243.56 |
| 6,786,472 | B1 | * | 9/2004 | Dahl | 254/25 |
| 6,829,800 | B2 | * | 12/2004 | Roebuck | 7/151 |
| 6,945,137 | B1 | * | 9/2005 | Hawkins | 81/3.55 |
| 7,185,879 | B1 | * | 3/2007 | Lejuez | 254/25 |
| D622,114 | S | * | 8/2010 | Balliet | D8/16 |
| D631,319 | S | * | 1/2011 | Davis | D8/88 |

* cited by examiner

METHOD AND APPARATUS FOR REMOVING A KNOCKOUT

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application claims priority to U.S. Application No. 61/312,141, filed Mar. 9, 2010, titled METHOD AND APPARATUS FOR REMOVING A KNOCKOUT, the entire contents of which are incorporated by reference herein and made a part of this specification.

BACKGROUND OF THE INVENTION

Circular saws have various types of arbors or drives. A circular saw can only use saw blades that matches the arbor. Common saw blade arbors include round arbors and diamond arbors. Some saw blades are manufactured with knockout portions, which allow a blade to be used with different arbors. For example a saw blade with a round arbor may have a knockout portion that can be removed to allow the saw blade to be used on a diamond arbor. The knockout portions are difficult to remove without damaging the blade or knocking it out of true. Saw blades need to run true without the slightest hint of a wobble. Many times a screw driver, wrench, hammer or any other tool that is lying around is used to remove the knockout portion. The knockouts are difficult to remove with these tools because they have not been designed to remove the knockout portions. Even if the user is successful at removing the knockout, the blade could be damaged or the knockout is only partially removed, which makes it even more difficult to remove. This procedure can also be dangerous due to the sharpness of the saw blades, which could result in the injury of the user attempting to remove the knockout.

SUMMARY OF THE INVENTION

Accordingly there is a need in the art for a tool that easily and quickly removes the knockout portion of a saw blade without damaging the saw blade and with a reduced likelihood of injuring the user.

In accordance with one embodiment, the present disclosure provides a method for removing a knockout portion of a saw blade using a breakout tool, the method comprising, inserting at least a portion of a head of the breakout tool through a center hole of the saw blade. The center hole extends between a first face and a second face of the saw blade. The slot region of the breakout tool engages with a first portion of the knockout portion of the saw blade and at least a portion of an engagement surface abuts the second face of the saw blade. A fulcrum section of a concave region engages with a second portion of the knockout portion of the saw blade and the fulcrum section abuts at least a portion of the first face of the saw blade. The first portion of the knockout region is opposite the second portion of the knockout region. A first force is applied to a body of the breakout tool and the first force is transferred to the fulcrum region and the engagement surface. The fulcrum region applies a substantially downward force to the second portion of the knockout region and the engagement surface applies a substantially upward force to the first portion of the knockout region. The knockout portion is broken out of the saw blade when the first force is applied until the upward force and the downward force exceed a threshold of the knockout region. When the knockout region threshold is exceeded the knockout region breaks free from the saw blade. When the knockout portion is removed from the saw blade the saw blade has a new center hole. The shape of the new center hole is substantially the shape of an outer edge of the knockout region.

In another embodiment the first force is applied in a direction that is substantially perpendicular to a center axis of the body of the breakout tool.

In some embodiments there may be a gap between an edge of the first portion and a point where the engagement surface applies a substantially upward force to the first portion. In some embodiments there may be a gap between an edge of the second portion and a point where the fulcrum section applies a substantially downward force to the second portion.

In accordance with another embodiment the present disclosure provides an apparatus for removing a knockout region from a saw blade, comprising: an elongate body having a center axis and a proximal end, and a distal end of the elongate body. The distal end further comprises a head, having a concave region and the concave region has a fulcrum section. The distal end also has a slot. The slot has a first surface and a second surface. The first surface is opposite the second surface and the first surface and the second surface are separated be a width greater than the thickness of the saw blade. The slot is positioned rearward of the concave region and the slot is angled at a substantially acute angle relative to the center axis. The concave region is sized and shaped such that the fulcrum section contacts a first portion of the knockout region on a first face of the saw blade. The slot is sized and shaped such that the first surface contacts a second portion of the saw blade on a second face of the saw blade and the first portion of the saw blade is opposite the second portion of the saw blade. The apparatus is configured such that the fulcrum region engages the first region and the slot engages the second portion at the same time.

In another embodiment the apparatus has a second slot. The second slot has a third surface and a fourth surface, wherein the third surface and the second surface are separated by a different width than the first surface and the second surface. The apparatus also has a second fulcrum section on the concave region.

The width of the elongate body may be is greater than a width of the head and the width of the head may be greater [that] *than* the width of the elongate body. The elongate body may have a handle portion. The handle portion may be ergonomically shaped. The elongate body may be substantially the same width and thickness. The apparatus may be made of made of a rigid material. In some [embodiment] *embodiments,* the apparatus is made of steel. [In some embodiments the apparatus is made of]

In some embodiments the proximal end of the elongate body also has a hex-shaped opening. The proximal end may be angled at a substantially obtuse angle relative to distal end. In some embodiments the first surface of the slot has a first engagement surface and a second engagement surface. The first surface and the second surface may be substantially parallel.

In accordance with another embodiment the present disclosure provides an apparatus for removing a knockout portion from a saw blade, comprising: a thin, elongate body, which has at least one angled slot; and a concave region comprising at least one fulcrum section and a recess positioned between the at least one slot and the concave region. The first end is sized and shaped such that the at least one angled slot engages a first portion of the knockout portion and the at least one fulcrum section contacts a second portion of the knockout region on a side opposite of an opening of the saw blade from first portion engaged by the at least one slot.

In some embodiments the at least one angled slot further comprises a first engagement surface and a second engagement surface.

In some embodiments a second end of the elongate body has a second angled slot; and a second concave region comprising a second fulcrum section. In other embodiments the second end of the elongate body has a hex-shaped opening. The second end may be angled at a substantially obtuse angle relative to first end.

BRIEF DESCRIPTION OF THE DRAWINGS

These and other features, aspects and advantages of the breakout tool are described below with reference to drawings of preferred embodiments, which are provided for the purpose of illustration and not for the purpose of limitation.

DETAILED DESCRIPTION OF THE PREFERRED EMBODIMENTS

Figure 1:
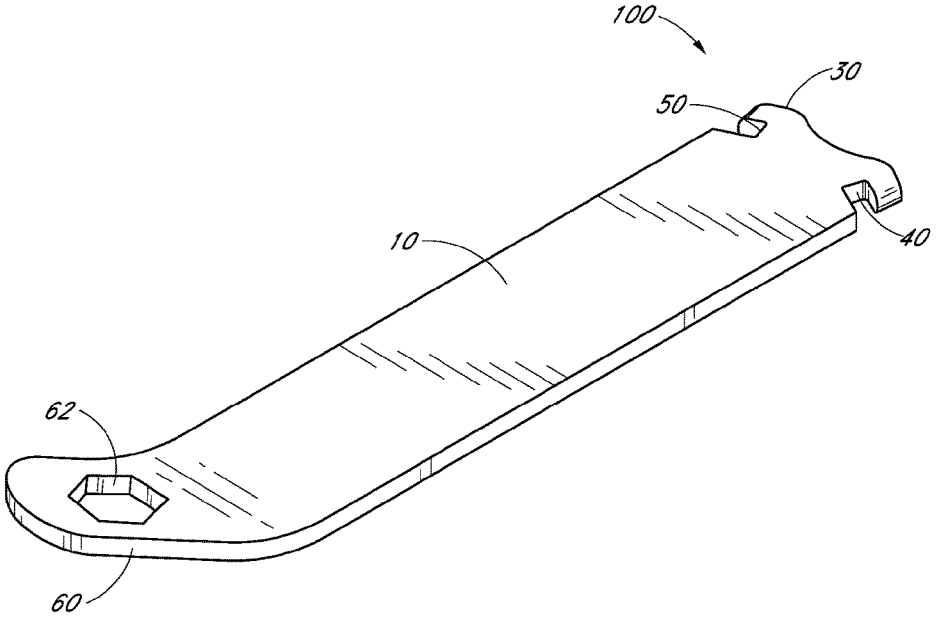
FIG. 1 is a front perspective view of one embodiment of a breakout tool.
Figure 2:
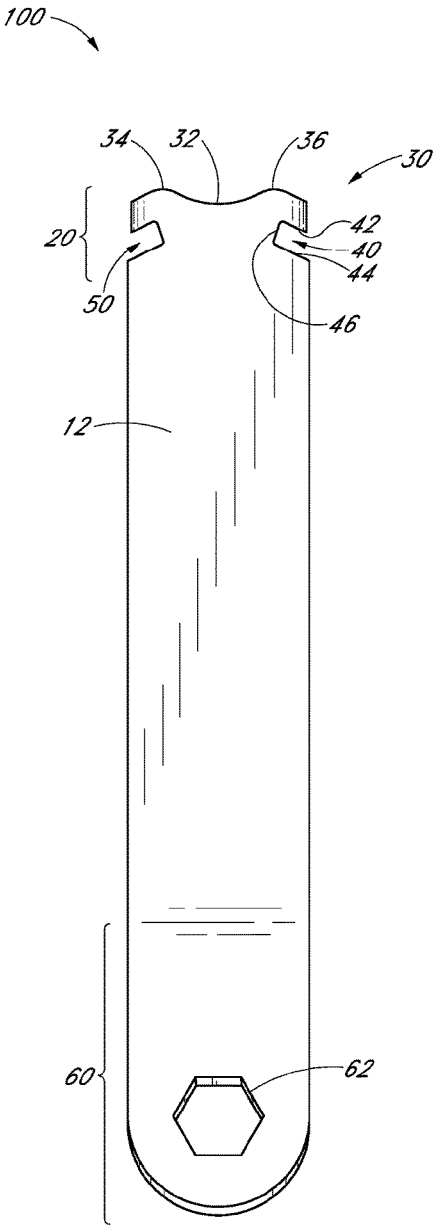
FIG. 2 is a front view of one embodiment of the breakout tool of FIG. 1.
Figure 3:
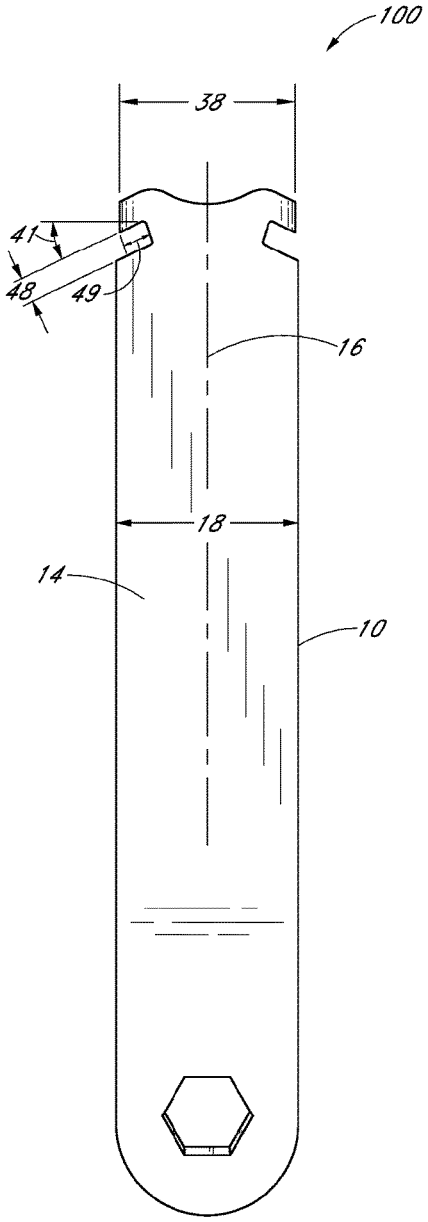
FIG. 3 is a back view of one embodiment of the breakout tool of FIG. 1.
Figure 4:
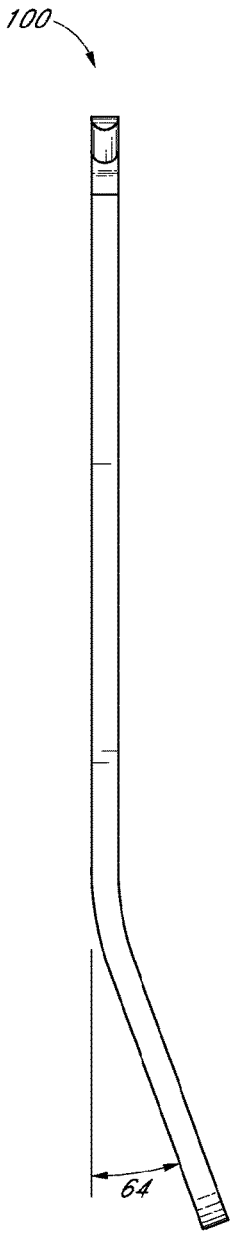
FIG. 4 is a right side view of one embodiment of the breakout tool of FIG. 1.
Figure 5:
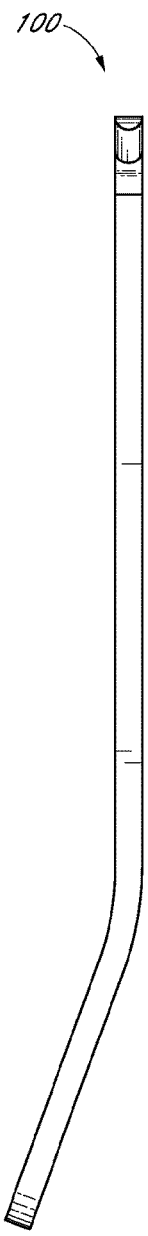
FIG. 5 is a left side view of one embodiment of the breakout tool of FIG. 1.
Figure 6:
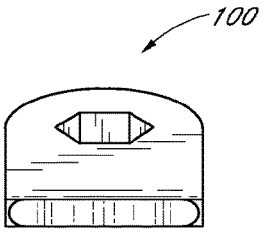
FIG. 6 is a bottom end view of one embodiment of the breakout tool of FIG. 1.
Figure 7:
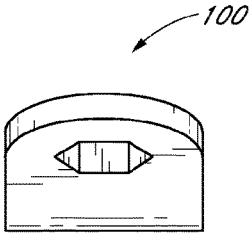
FIG. 7 is a top end view of one embodiment of the breakout tool of FIG. 1.

The disclosure provided in the following pages describes some examples of some embodiments of the invention. The designs, figures, and description are non-limiting examples of some embodiments of the invention. Other embodiments of the tool may or may not include the features disclosed herein. Moreover, disclosed advantages and benefits may apply to only some embodiments of the invention, and should not be used to limit the scope of the invention.

FIGS. 1 through 7 illustrate an embodiment of a breakout tool 100 used for removing a knockout portion of a saw blade. The break out tool is an elongate body 10 having a proximal end 60 and a distal end 20. The elongate body 10 has a center axis 16 and a width 18. The elongate body 10 is of a uniform thickness. In some embodiments the elongate body 10 may have a varying thickness. The section between the proximal end 60 and distal end 20 of the body may have a handle portion. The handle portion may be ergonomically shaped to better accommodate a person gripping the tool. The handle portion may have a rubberized grip or a textured surface.

The distal end 20 has a head 30, a first slot 40, and a second slot 50. The head has a concave portion 32 and at least one fulcrum section. In this embodiment the concave region 32 has a first fulcrum section 34 and a second fulcrum section 36. The concave region may be of variable shapes and depths. The head has a width 38. The head width 38 is substantially the same as the width of the elongate body 18. In some embodiments the head width 38 may be greater or less than the width of the elongate body 10. The first and second slots 40, 50 are positioned rearward of the head 30.

The first slot 40 is defined by a first surface 42, or engagement surface, a second surface 44, and an end surface 46, a slot width 48, a slot depth 49, and a slot angle 41. The slot 40 extends between the first face 12 and the second face 14 of the elongate body 10. The slot 40 maintains substantially the same width and depth between the first and second faces 12, 14. The first surface 42 extends from the outer edge of the head 30 up to the end surface 46. The end surface 46 is substantially perpendicular to the first surface 42. In this embodiment the end surface 46 is flat, in some embodiments the end surface 46 may be rounded or a semi-circle. The second surface 44 extends from the outer edge of the elongate body 10 to the end surface 46. The second surface is substantially perpendicular to the end surface. The first surface 42 is substantially parallel to the second surface 44. The first and second surfaces 42, 44 have substantially the same angle 41 relative to the center axis 12. Preferably, the angle 41 is an acute angle relative to the center axis 16. The depth of the slot 40 is measured from the edge of the elongate body 10. The width of the slot 48 is measured between the first and second surfaces 42, 44. In this embodiment the width 48 of the slot 40 is uniform, in some embodiments the width of the slot 40 may taper or vary.

Preferably each slot has a corresponding fulcrum section on the opposite side of the tool. Thus, if only one slot is provided, the corresponding fulcrum section should be present on the opposite side. In this embodiment, the first slot 40 pairs up with the first fulcrum section 34 and the second slot 50 pairs up with the second fulcrum section 36.

The width 48 and depth 49 of the slot 40 are configured so that the slot 40 can engage a knockout portion of a saw blade. Similarly, the size, shape and location of the fulcrum sections and concave region 32 preferably are configured such that only the fulcrum section 34 contacts the saw blade at a desired location and the concave region 32 accommodates a portion of the saw blade radially inward from the location contacted by the fulcrum section 34. The angle 41 and depth 49 of the slot are configured so that when the slot 40 is engaged with the knockout portion, the fulcrum section 34 generally abuts the opposite side of the knockout region.

Figure 10:
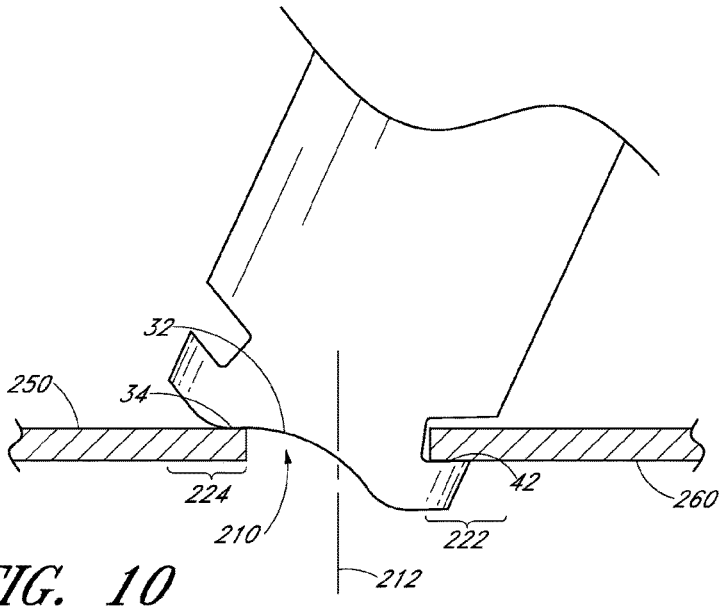
FIG. 10 is a cross-section of the embodiment of the breakout tool illustrating the removal of the saw blade knockout portion taken along line 10-10 of FIG. 9.

Preferably, and with reference to FIG. 10, the angle 41 and location of the slot 40 are configured such that, when the tool 100 engages a knockout portion of a saw blade, the engagement surface 42 lays flat against one surface of the saw blade while the fulcrum section 34 contacts the opposite surface of the saw blade. In such an arrangement, an imaginary line that is coincident with the engagement surface 42 and extends past the fulcrum section 34 is spaced from the fulcrum section 34 by a distance equal to, or substantially equal to, a thickness of a knockout portion of a saw blade with which the tool 100 is configured to work. Similarly, an imaginary line coincident with and extending from the second surface 44 passes through or close to the fulcrum section 34. The closer the width 48 of the slot 40 is to the thickness of the saw blade, the closer the imaginary line extending from the second surface 44 will be to the fulcrum section 34.

Preferably, the second slot 50 is a mirror image of slot 40. In some embodiments the first slot 40 and the second slot 50 are configured differently. For example the slots 40, 50 may have different thicknesses and depths. The slots 40, 50 may have different angles 41 relative to the center axis 16. In other embodiments there may only be a single slot. The proximal end 60 is angled relative to the elongate body 10. The angle 64 is substantially obtuse relative to the plane of the body 10. In some embodiments the elongate body 10 is substantially flat. The proximal end has a hex-shaped opening 62. Preferably the hex-shaped opening 62 corresponds to a standard hex wrench size, such as metric or American. Preferably the hex-shaped opening 62 is configured to engage a fastener, such as an arbor bolt, of a circular saw and is sized accordingly. The angle 64 of the proximal end is configured such that it is easier to engage and manipulate a fastener.

In some embodiments there is no hex shaped opening at the proximal end 60. The proximal end may repeat the configuration of the distal end 20, or may include a different tool or may not include any tool. Preferably the tool is formed of a material that substantially resists deformation when force is applied to the proximal or distal ends of the elongate body, such as a rigid metal (e.g., steel), for example. The tool may be formed of multiple materials, for example the ends may be formed of a rigid material and the handle portion may be formed of a softer material such as rubber or plastic material.

Figure 8:
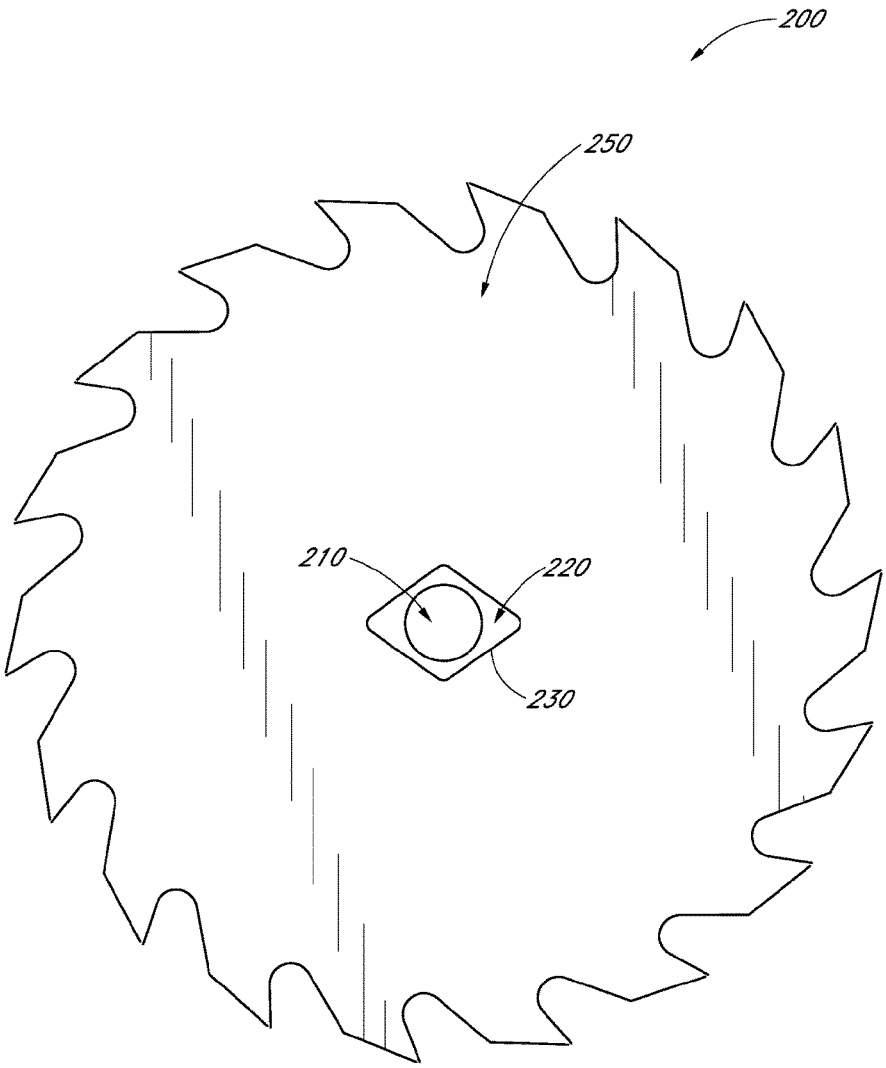
FIG. 8 is an embodiment of a saw blade with a knockout portion.

FIG. 8 illustrates an embodiment of a saw blade 200 for use in a certain circular saw. The circular saw is a metal disc with a plurality saw teeth about an outer edge. The saw blade 200 has a knockout portion 220. The knockout portion 220 has a circular opening 210, or center hole, that extends between a first face 250 and a second face 260 of the saw blade. The center hole 210 has an axis 212. In this embodiment the knockout portion 220 is a diamond shaped slug that is prefabricated into the saw blade 200. With the proper application of force the diamond-shaped knockout slug 220 can be removed. After the knockout portion 220 is removed the knockout opening, or second center hole, is substantially the same shape as the outer edge 230 of the knockout portion 220. In this embodiment the saw blade converts from a circular drive to a diamond drive after the knockout portion is removed.

Figure 9:
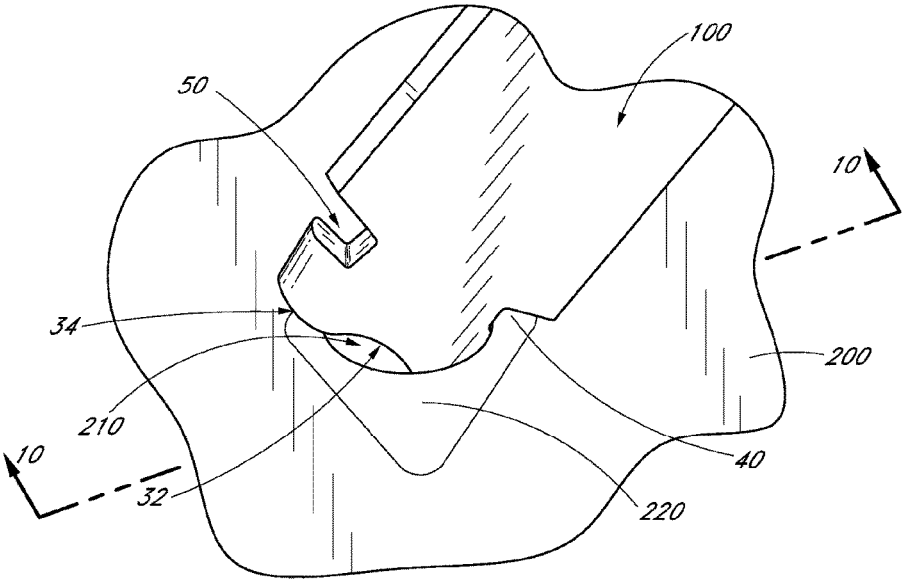
FIG. 9 is an embodiment of a breakout tool illustrating the removal of a saw blade knockout portion.

FIGS. 9 and 10 illustrate an embodiment of a knockout tool 100 being used to remove a knockout portion 220 from a saw blade 200. The distal end 20 of the elongate body 10 is inserted into the center hole 210 of the saw blade 200. The concave region 32 is configured such that the slot 40 and the fulcrum section 34 engage the knockout portion 220.

The slot 40 engages a first portion 222 of the knockout region 220. The engagement surface 42 abuts, or contacts, the first portion 222 of the of knockout region 220. Preferably, the engagement surface 42 contacts the first portion 222 along a radial distance from the edge of the center hole 210 extending radially outward into the knockout region 220 or body of the saw blade 200. The radial distance of contact may be substantially equal to the entire length of the engagement surface 42. In other arrangements, the engagement surface 42 may contact the first portion 222 at a location spaced from the edge of the center hole 210 such that there is a gap between the edge of the center hole 210 and the point at which the engagement surface 42 contacts the first portion 222 of the knockout portion 220. The outer edge of the engagement surface 42 may be the only portion that contacts the first portion 222. In some embodiments the engagement surface may contact the edge of the first portion 222.

The fulcrum section 34 abuts, or engages, a second portion 224 of the knockout portion 220. Preferably there is a distance or gap between the edge of the center hole 210 and the point at which the fulcrum section 34 contacts the second portion 224 of the knockout portion 220. In some embodiments the fulcrum section 34 may contact the edge of the second portion 224. The concave section 32 accommodates (if necessary) the portion of the knockout region 220 between the center hole 210 and the location at which the fulcrum section 34 contacts the second portion 224.

The first portion 222 is positioned opposite the second portion 224. Generally, the knockout portion 220 is shaped like an elongate diamond. Preferably, the tool 100 is aligned with the minor, or smaller, axis of the diamond-shaped knockout portion 220 because the force required to remove the knockout portion 220 is lower. However, the tool 100 may be used to remove the knockout portion 220 when aligned perpendicular to the minor axis (or along the major axis) or any other orientation.

To remove the knockout portion 220, a leveraging force is applied to the tool 100. Preferably force is applied to the body 10 in a direction that is substantially perpendicular to the axis 16 of the body 10 or the center hole axis 212, which may be a pulling motion. When force is applied to the body 10 the fulcrum section 34 of the concave region 32 acts as a fulcrum surface for application of the leveraging force and the slot 40, more specifically the engagement surface 42, exerts a force on the knockout region 220. The knockout portion 220 is removed when substantially enough force has been applied to overcome a threshold value, which may depend on the particular design or manufacture of the saw blade 200. Preferably when substantially enough force has been applied the knockout portion 220 is removed as a single piece.

Specifically, the force applied to the body 10 is transferred to the first portion 222 of the knockout portion 220 through the engagement surface 42. Preferably the slot 40 is shaped and configured such that the force is applied to the first portion 222 in a substantially upward direction, which is substantially parallel to the center hole axis 212. The upward force is applied to the second face 260. A portion or edge of the engagement surface 42 applies the force to the second portion 222. Preferably there is a distance or gap between the inner edge of the center hole 210 and the area of the first portion 222 where the force is applied. That is, preferably the force is not applied strictly at the edge of the center hole 210.

The force applied to the body 10 is also transferred to the second portion 224 of the knockout portion 220 through the fulcrum section 34. Preferably the fulcrum section 34 is configured such that the force is applied in a substantially downward direction, which is substantially parallel to the center hole axis 212. The downward force is applied to the first face 250. The fulcrum section 34 applies the force to the second portion 222. In some embodiments the fulcrum section 34 may apply the force to edge of the center hole 210 of the second portion. Preferably the shape and configuration of the concave region 32 determines the point at which the fulcrum section 34 contacts the second portion 224.

Preferably there is a distance or gap between the inner edge of the center hole 210 and the area of the second portion 224 where the force is applied.

After the knockout portion 220 has been removed from the saw blade 200, the saw blade has a center opening that is substantially the shape of the outer edge of the knockout portion 220. The hex-shaped region 62 may be used to secure the saw blade 200 to a circular saw. In some embodiments there may be a kit comprising two or more of the following components: the saw blade, the breakout tool, and the circular saw, among other components.

Figure 11:
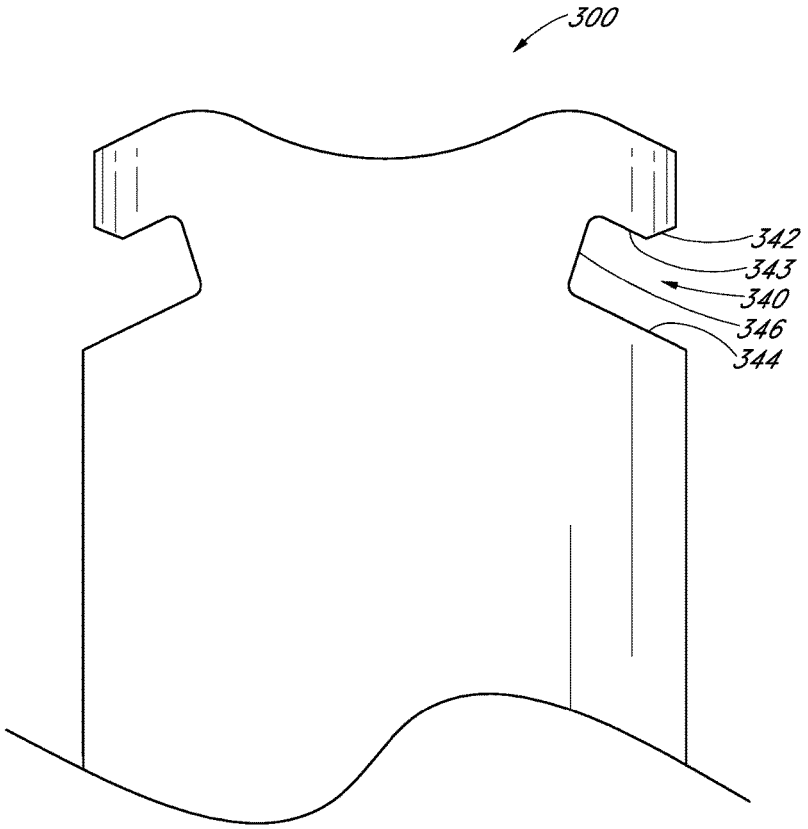
FIG. 11 is another embodiment of a breakout tool.

FIG. 11 illustrates a tool 300 having an alternate embodiment of a slot 340. In this embodiment of a slot 340, the engagement surface comprises a first engagement surface 342 and a second engagement surface 343. A second surface 344 is parallel the second engagement surface 343. Preferably, a width at the opening of the slot 340 is larger than a width at the closed end of the slot 340, which is defined by the end surface 346. In particular, the first engagement surface, or lead-in surface 342, intersects the second engagement surface 343 and extends outwardly in a direction away from the second surface 344. Such an arrangement facilitates entry of a saw blade or knockout portion into the slot 300.

The first engagement surface 342 may provide another surface for removing the knockout portion 220 of the saw blade 200. When the tool 300 engages the saw blade 200, the second engagement surface 343 may not be completely flush with the face of the knockout portion 222. When a force is applied to the tool the first engagement surface 342 provides an additional flat surface that may more fully engage the knockout portion 222 during removal of the knockout 220.

The embodiments discussed above describe a breakout tool where the body is substantially uniform in width and thickness. In other embodiments, the body may not be uniform and may include a handle region or may be more ergonomically shaped. It should be appreciated that the embodiment illustrated may be modified to engage saw blades of varying thickness. For example, in some embodiments the angled slots may be a different size on each side of the tool to accommodate different size blades. Additionally, in some embodiments, the head may be a different shape. In addition, although the illustrated breakout tool is well-suited for use in removing a diamond knockout of a saw blade, it may also be used, or modified for use, with knockouts of a different shape, knockouts on items other than a saw blade or to apply a leveraging force to items other than knockouts.

It is thus to be understood that the embodiments set forth above are illustrative of inventive principles and features, and these principles may be applied to various breakout tools. As such, the principles and features discussed herein can be applied in embodiments of various shapes, sizes and configurations.

What is claimed is:

1. An apparatus for removing a knockout region from a saw blade, comprising:

an elongate body having a center axis and a proximal end;

a distal end of the elongate body further comprising:

a head, having a concave region and a fulcrum section, wherein the concave region is centered about the center axis and defined by a continuous arcuate surface, wherein an apex of the concave region is positioned inward toward the proximal end of the elongate body, wherein the fulcrum section is defined by a convex continuous arcuate surface extending distally outward relative to the concave region, wherein the fulcrum section is contiguous with the concave region;

a slot, wherein the slot comprises a first surface and a second surface, wherein the first surface is opposite the second surface, wherein the first surface and the second surface are substantially parallel and are separated by a width greater than the thickness of the saw blade, wherein the slot is positioned rearward of the concave region and opposite of the fulcrum section, wherein the slot is angled at a substantially acute angle relative to the center axis;

wherein the concave region is sized and shaped such that the fulcrum section contacts a first portion of the knockout region on a first face of the saw blade;

wherein the slot is sized and shaped such that the first surface contacts a second portion [of the saw blade] *of the knockout region* on a second face of the saw blade, wherein the first portion [of the saw blade] *of the knockout region* is opposite the second portion [of the saw blade] *of the knockout region*; and wherein the apparatus is configured such that the fulcrum region engages the first *portion of the knockout* region and the slot engages the second portion *of the knockout region* at the same time.

2. The apparatus of claim 1 further comprising:

a second slot, wherein the second slot comprises a third surface and a fourth surface, wherein the third surface and the second surface are separated by a different width than the first surface and the second surface; and a second fulcrum section on the concave region.

3. The apparatus of claim 1 wherein a width of the elongate body is greater than a width of the head.

4. The apparatus of claim 1 wherein the elongate body further comprises a handle portion.

5. The apparatus of claim 1 wherein the proximal end of the elongate body further comprises a hex-shaped opening, wherein the proximal end is angled at a substantially obtuse angle relative to distal end.

6. The apparatus of claim 1 wherein the elongate body is substantially the same width and thickness.

7. The apparatus of claim 1 wherein the apparatus is made of a rigid material.

8. The apparatus of claim 1 wherein the apparatus is made of steel.

9. The apparatus of claim 1 wherein the first surface further comprises a first engagement surface and a second engagement surface.

10. An apparatus for removing a knockout portion from a saw blade, comprising:

a thin, elongate body;

a first end of the thin, elongate body comprising:

at least one angled slot having a substantially uniform width; and a head comprising at least one fulcrum section and a concave region [positioned between], *wherein* the at least one *angled* slot and the fulcrum section *are positioned on opposite sides of the concave region*, wherein the concave region is defined by a continuous arcuate surface, wherein an apex of the concave region is positioned inward toward a proximal end of the elongate body, wherein the fulcrum section is defined by a convex continuous arcuate surface extending distally outward relative to the concave region, wherein the fulcrum section is contiguous with the concave region;

wherein the first end is sized and shaped such that the at least one angled slot engages a first portion of the knockout portion and the at least one fulcrum section contacts a second portion of the knockout [region] *portion* on a side opposite of an opening of the saw blade from *the* first portion *of the knockout portion* engaged by the at least one *angled* slot.

11. The apparatus of claim 10 wherein the at least one angled slot further comprises a first engagement surface and a second engagement surface.

12. The apparatus of claim 10 further comprises a second end comprising:

a second angled slot; and a second concave region comprising a second fulcrum section.

13. The apparatus of claim 10 wherein a second end of the elongate body further comprises a hex-shaped opening, wherein the second end is angled at a substantially obtuse angle relative to first end.

* * * * *